Jan. 3, 1956   L. N. GRAFINGER ET AL   2,729,061
FUEL-AIR RATIO CONTROL SYSTEM FOR A RAM-JET ENGINE
Filed June 4, 1952   3 Sheets-Sheet 1

INVENTORS
BERNARD J. O'CONNOR
LOUIS N. GRAFINGER
BY
Herbert L Davis
ATTORNEY

Jan. 3, 1956   L. N. GRAFINGER ET AL   2,729,061
FUEL-AIR RATIO CONTROL SYSTEM FOR A RAM-JET ENGINE
Filed June 4, 1952   3 Sheets-Sheet 3

FIG. 4

INVENTORS
BERNARD J. O'CONNOR
LOUIS N. GRAFINGER
BY

*Herbert L. Davis*
ATTORNEY

United States Patent Office 2,729,061
Patented Jan. 3, 1956

2,729,061

FUEL-AIR RATIO CONTROL SYSTEM FOR A RAM-JET ENGINE

Louis N. Grafinger, Paramus, N. J., and Bernard J. O'Connor, Tuckahoe, N. Y., assignors to Bendix Aviation Corporation, Teterboro, N. J., a corporation of Delaware Application June 4, 1952, Serial No. 291,738

24 Claims. (Cl. 60—39.28)

The present application relates to improvements in a fuel-air ratio control system of a ram-jet engine of a type such as disclosed and claimed in the copending applications Serial No. 159,781, filed May 3, 1950, by Joel D. Peterson, and Serial No. 270,846, filed February 9, 1952, by Louis N. Grafinger and Bernard J. O'Connor, and both of which applications have been assigned to Bendix Aviation Corporation.

An object of the invention is to provide novel means to control the thrust of an aircraft or missile so as to accelerate it to a predetermined Mach-number, such as Mach-number 2.0, in the minimum time after launching, and to maintain the aircraft or missile at the predetermined Mach-number during flight.

Another object of the invention is to provide a novel fuel-air ratio control to maintain the fuel-air ratio of an aircraft engine at a value selected by a Mach-number control so as to maintain the aircraft in flight at a predetermined Mach-number.

Another object of the invention is to provide a novel fuel control system for a ram-jet engine including a fuel-air ratio computer, a Mach-number computer to select the fuel-air ratio in accordance with the deviation of the computed Mach number from a predetermined Mach number, and means to control the fuel to the engine in accordance with the deviation of the computed fuel-air ratio from the selected fuel-air ratio so as to regulate the fuel-air ratio and effect the predetermined Mach-number under the prevailing flight conditions.

Another object of the invention is to provide a novel control system including a lead-network compensator, operating upon the Mach-number error plus Mach-number error-rate signal, to give an effective control signal proportional to Mach-number error plus the first and second time derivatives of Mach-number error, i. e., rate-of-change of Mach-number error and the rate-of-change of the rate-of-change of Mach-number error. This composite control signal causes a servomotor to position an output shaft and control means operated thereby so as to effect whatever fuel-air ratio is necessary to maintain the aircraft or missile at a predetermined Mach-number under the prevailing operating conditions and eliminate any Mach-number error under steady-flight conditions. The use of the first and second derivatives of Mach error makes possible a stable integral-type controller. The stabilized integral controller reduces to zero all steady state errors in Mach number caused by aerodynamic loading and changes in altitude while the first and second derivative terms in the controller reduce the overshoot in Mach number during the launch transient.

Another object of the invention is to provide a novel ram-jet engine fuel control system in which there is provided a first control loop to compute the actual fuel-air ratio of the engine under the prevailing operating conditions and a second control loop to compute the actual Mach number under the prevailing operating conditions, the second control loop operating a fuel-air ratio selecting means to vary the selected fuel-air ratio so as to correct for any difference between the computed actual Mach-number and a preselected Mach-number and in which the fuel-air ratio selected by the second control loop is compared with the actual fuel-air ratio computed by the first control loop to effect an error signal for causing a fuel control means to vary the fuel-air ratio to the value selected by the second control loop and thereby maintain the computed actual Mach-number at the preselected value.

Another object of the invention is to provide in the aforenoted ram-jet engine fuel control system a novel stop mechanism effective to prevent the selected fuel-air ratio from exceeding predetermined minimum and maximum limits sufficient to prevent blowout of the engine due to either an excessively rich or lean fuel-air ratio in the event severe loading should occur due to maneuvering of the aircraft or missile.

Another object of the invention is to provide novel means effective during the initial accelerating period and the resulting large Mach-number error signal to drive the fuel-air ratio selecting mechanism against a maximum fuel-air ratio stop so that the Mach-number control loop is cut out of operation causing the fuel control means to tend to regulate the fuel-air ratio to the maximum permissible value and which means includes a rate-of-change of Mach number responsive means effective as the aircraft or missile speed increases above a predetermined value, of for example, Mach-number 1.7 to cause derivative signals (that is, a rate-of-change of Mach-number signal and a rate-of-change of the rate-of-change of Mach-number signal) which causes the fuel control means to decrease the fuel supplied to the engine so that by the time a preselected Mach-number is attained, the controlled fuel is approximately that required for maintaining the preselected Mach-number under the existing flight conditions.

Another object of the invention is to provide novel means whereby under abnormal flight conditions such that the integrated Mach-number error is great enough to drive the integrator against either an upper or lower limit stop, the Mach-number control loop will be cut out of operation and will remain cut out of operation until the increase (or decrease) in thrust obtained by operating at the maximum (or minimum) permissible fuel-air ratio has brought the aircraft or missile Mach number back within the range of fuel-air ratio control so as to assure that the fuel-air ratio is maintained within the combustible range, under all operating conditions. Thus, for any operating condition for which the Mach-number requirements and the fuel-air ratio requirements cannot be met simultaneously, the fuel-air ratio requirements will be met to assure against engine blowout.

The above and other objects and features of the invention will appear more fully hereinafter from a consideration of the following description taken in connection with the accompanying drawing wherein one embodiment of the invention is illustrated by way of example.

Referring to the drawings wherein like reference characters designate like parts.

Figure 1:
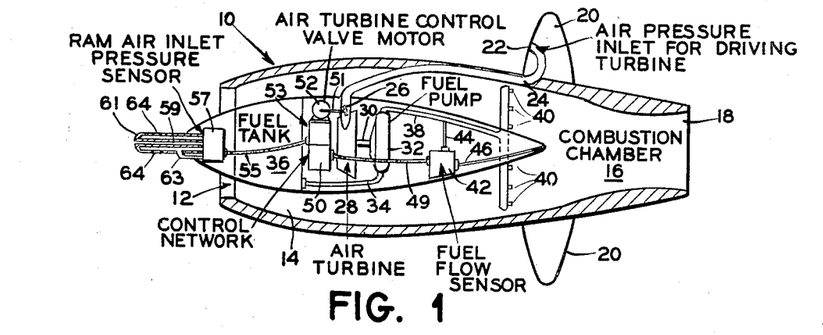
Figure 1 is a schematic sectional view of a typical aircraft or missile with which the subject control system is designed for use.

Referring now to the drawing of Figure 1, there is illustrated schematically a ram-jet engine in an aircraft or missile indicated generally by the numeral 10 and including an air inlet 12 leading past the venturi section 14 into a combustion chamber 16 and out a restricted exhaust passage 18.

Wing portions 20 project from the body of the aircraft 10 and an airscoop 22 in the leading edge of the wing 20 directs air under pressure through a passage 24 controlled by a throttling valve 26 to a suitable turbine 28 driving through a shaft 30 a fuel pump 32.

A conduit 34 connects the inlet of the fuel pump 32 to a fuel reservoir 36 while a conduit 38 connects the outlet of the fuel pump 32 to suitable fuel nozzles 40 opening into the combustion chamber 16. The nozzles 40 are of a conventional type design so that the weight of fuel supplied through the nozzles 40 to the combustion chamber 16 is directly proportional to the drop in fuel pressure across the nozzles 40.

Sensing this pressure drop across the nozzles 40 is a fuel-flow sensor 42 responsive through a conduit 44 to the fuel pressure in line 38 and through a conduit 46 to the pressure in the combustion chamber 16. The fuel-flow sensor 42 is operatively connected through a suitable electrical cable 49 to a fuel-air ratio computer indicated generally by the numeral 50 and explained hereinafter in greater detail with reference to Figure 2.

The throttling valve 26 controlling the pressure of the air supplied the turbine 28 and thereby the speed of the fuel pump 32 is operatively positioned through a shaft 51 by a servomotor 52 controlled by a ram-jet fuel control system shown in Figure 4 and including the fuel-air ratio computer 50 and a Mach number control 53, shown in Figures 2 and 3 respectively and explained in greater detail hereinafter.

The fuel-air ratio computer 50 and the Mach-number control 53 are operatively connected through a suitable electrical cable 55 to a pressure sensor 57 responsive through a conduit 59 to the total or ram-air inlet pressure sensed at the mouth of a Pitot tube 61 of conventional type. The pressure sensor 57, as hereinafter explained, also includes means responsive to the static or ambient atmospheric pressure at the level of flight of the aircraft and sensed through a conduit 63 connected in a conventional manner to a point on the Pitot tube 61 behind the shock wave and opening through ports 64 to the ambient atmosphere.

Figure 2:
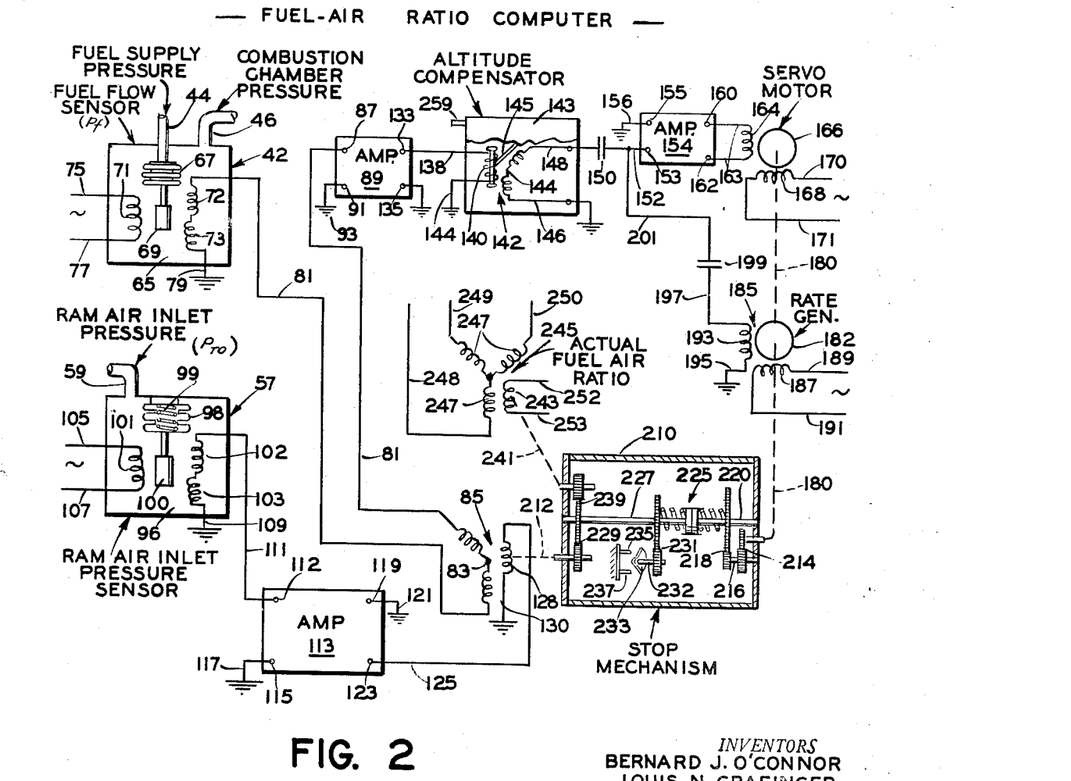
Figure 2 is a schematic diagram of the fuel-air ratio computer.

*Fuel-air ratio computer of Figure 2*

Referring now to the drawing of Figure 2, there is shown diagrammatically the fuel-air ratio computer in which there is provided the fuel-flow sensor 42 including a chamber 65 having its interior connected through conduit 46 to the pressure in the combustion chamber 16.

Mounted within the chamber 65 is a suitable bellows 67 having its interior subject to fuel pressure applied through the conduit 44 connected to the outlet conduit 38 from pump 32. The exterior surface of the bellows 67 is subject to the combustion-chamber pressure applied through conduit 46. Thus the bellows 67 senses the pressure drop across the fuel nozzles 40 and tends to expand as the sensed fuel pressure increases relative to the sensed combustion-chamber pressure and contract upon a decrease in the sensed fuel pressure relative to the sensed combustion-chamber pressure.

Operatively connected to the bellows 67 is a suitable magnetic core or iron slug 69 adjustably positioned in relation to a primary winding 71 and reversely wound secondary windings 72 and 73 of an inductive transformer so as to vary the coupling relation between the primary winding 71 and the secondary windings 72 and 73 with changes in the difference between sensed combustion-chamber and fuel pressures.

The primary winding 71 is connected by conductors 75 and 77 across a main source of constant-frequency alternating current and inductively coupled to the reversely wound secondary windings 72 and 73. The coupling relation between the primary winding 71 and windings 72 and 73 varies depending upon the adjusted position of the magnetic core 69. Thus, at the position of the magnetic core 69 under conditions, for example, when the combustion-chamber pressure is equal to a predetermined bias fuel pressure and the bellows 67 has expanded to its bias position, the signal induced in the windings 72 and 73 will be balanced and the net output will be zero. However, upon the fuel pressure increasing relative to the combustion-chamber pressure, the expansion of the bellows 67 will cause the iron core 69 to move downward causing an unbalanced relationship between the voltages induced in windings 72 and 73 and effecting in turn an increase in the electrical signal applied across the output lines, i. e., the signal across a common ground connection 79 and output conductor 81.

The output conductor 81 has serially connected therein a secondary stator winding 83 of a variable coupling transformer 85. As shown in Figure 2, the conductor 81 leads to an input 87 of an amplifier 89 having its other input 91 connected by a conductor 93 to a common ground connection and thus to the electrical output of the fuel flow sensor 42.

Also affecting the signal to the input of the amplifier 89 is a ram-air inlet pressure sensor 57 including a chamber 96 having its interior connected through the conduit 59 to the total or ram-air inlet pressure sensed at the mouth of the Pitot tube 61, shown schematically at Figure 1.

Mounted within the chamber 96 is a suitable bellows 98 responsive to the pressure applied through conduit 59. The bellows 98 may be evacuated and loaded by a spring 99 so as to expand upon a decrease in the sensed ram-air inlet pressure acting exteriorly upon the bellows 98 and contract upon an increase in the ram-air inlet pressure. Operatively connected to the bellows 98 is a suitable magnetic core or an iron slug 100 adjustably positioned in relation to a primary winding 101 and reversely wound secondary windings 102 and 103 of an induction transformer so as to vary the coupling relation between the primary winding 100 and the secondary windings 102 and 103 with changes in the sensed ram-air inlet pressure.

The primary winding 101 is connected by conductors 105 and 107 across the main source of constant-frequency alternating current and inductively coupled to the reversely wound secondary windings 102 and 103. The coupling relation between the primary winding 101 and the windings 102 and 103 varies depending upon the adjusted position of the magnetic core 100.

Thus, at an extreme position of the magnetic core 100 under conditions, for example, when the ram-air inlet pressure is at its minimum value and the bellows 98 has expanded to its maximum position, the signal induced in the windings 102 and 103 will be balanced and the net output will be zero.

However, upon the ram-air inlet pressure increasing, contraction of the bellows 98 will cause the iron core 100 to move upward causing an unbalanced relationship between the voltages induced in windings 102 and 103, and, thus, effecting in turn an increase in the electrical signal applied across the output lines with increase in ram-air inlet pressure, i. e., the signal across a common ground connection 109 and output conductor 111.

As shown in Figure 2, the conductor 111 leads to an input 112 of an amplifier 113, having its other input 115 connected by conductor 117 to a common ground connection and, thus, to the electrical output of the ram-air inlet pressure sensor 57.

The amplifier 113 is of a conventional type and has an output connection 119 connected by a conductor 121 to a common ground and another output connection 123 connected by conductor 125 to a rotor winding 128 of the variable coupling transformer 85. The opposite end of the rotor winding 128 is connected by conductor 130 to a common ground so that the rotor winding 128 of the variable coupling transformer 85 is connected across the output of the amplifier 113.

The variable coupling transformer 85 is of a conventional type having a pair of stator windings 83 reversely wound and arranged so that rotor winding 128 may be adjusted in inductive relation thereto over a predetermined range.

The output voltage from the variable coupling transformer 85 will now depend upon both the excitation of the rotor winding 128 as well as the angular position of the rotor winding 128 relative to the stator windings 83.

When the rotor 128 has been adjusted to a position corresponding to the prevailing fuel-air ratio, the voltages induced in the circuit 81 by the variable coupling transformer 85 will balance that induced in line 81 by the fuel-flow sensor 42 so that no error signal would then be applied across the inlet terminals 87 and 91 of the amplifier 89.

However, upon the rotor 128 of the variable coupling transformer 85 being in a position such that under the prevailing fuel flow conditions there is a resultant error signal in one sense or the other, there will be then applied to the input terminals 87 and 91 of the amplifier 89 an error signal which is then amplified through the amplifier 89 and applied to output terminals 133 and 135 of the amplifier 89. The amplifier 89 may be of a suitable conventional type and has its output terminal 135 connected by a conductor to a common ground, while its output terminal 133 is connected by a conductor 138 to a rotor winding 140 of a variable coupling transformer 142 provided in an altitude compensator 143. The opposite terminal of the rotor winding 140 is connected by a conductor 144 to a common ground. Thus, the rotor winding 140 of the variable coupling transformer is connected across the output terminals 133 and 135 of the amplifier 89. The rotor winding 140 is inductively coupled to the stator windings 144 and may be adjustably positioned relative thereto by a shaft 145 controlled by an altitude pressure responsive device in the compensator 143, as hereinafter described. The stator windings 144 are connected by one conductor 146 to a common ground and by a second conductor 148 through a capacitor 150 and conductor 152 to an input terminal 153 of an amplifier 154. The opposite input terminal 155 of amplifier 154 is connected by a conductor 156 to a common ground.

Amplifier 154 is of conventional type and has output terminals 160 and 162. The terminals 160 and 162 are connected by conductors 163 to a control winding 164 of a two-phase reversible electric servomotor 166 of conventional type and having a fixed phase winding 168 connected across the source of constant-frequency alternating current through conductors 170 and 171.

The direction of rotation of the servomotor 166 will be determined in a conventional manner by the electrical phase of the control signal applied across the output terminals 160—162 of the amplifier 154, which is in turn dependent upon the phase of the signal applied across the input terminals 87 and 91 of the amplifier 89, which is dependent upon the signal voltages affecting circuit 81. Moreover, the speed of rotation of the motor 166 will vary directly with the magnitude of the control signal at the output terminals 160—162 of the amplifier 154.

*Rate generator*

The servomotor 166 drives through a shaft 180 a rotor element 182 of a rate generator 185. The rate generator 185 is of conventional type and has an input winding 187 connected by conductors 189 and 191 across the source of constant-frequency alternating current and inductively coupled to an output winding 193 by the rotor element 182. The output winding 193 is connected by conductor 195 to a common ground and by another conductor 197 through a capacitor 199 and conductors 201 and 152 to the input terminal 153 of the amplifier 154. Thus, the output winding 193 of the rate generator 185 is connected across the input terminals 153 and 155 of the amplifier 154. There is applied by the rate generator 185 to the input of the amplifier 154 a rate signal of the frequency of the A. C. source and of a magnitude proportional to the rate of rotation of the rotor element 182. Adjustment of the servomotor 166 in one direction or the other, effects rotation of the rate generator 185 in such a manner as to apply a rate signal across the input terminals 153 and 155 of the amplifier 154 of a phase acting in inverse relation to the error signal applied across input terminals 153 and 155 so as to tend to retard and prevent over-adjustment of the servomotor 166.

The rate signal induced by the rate generator 185 is proportional to the speed of the motor 166 which in turn tends to reflect the rate-of-change of the fuel-air ratio.

*Stop mechanism*

Moreover, upon an error signal, the shaft 180 of the servomotor 166 drives through a stop mechanism 210 a shaft 212 to position the rotor winding 128 of the variable coupling transformer 85 in a direction so as to wipe out the error signal and rebalance the voltages in circuit 81.

The stop mechanism 210 includes gearing 214 driven by the shaft 180, a stub shaft 216, gearing 218, a second shaft 220 drivingly connected by a spring clutch 225 of conventional type to a third shaft 227. Shaft 227 in turn is connected through gearing 229 to the shaft 212. Also driven from shaft 227 is a second gearing 231, and shaft 232 connected to a member 233 which is arranged to engage at minimum and maximum limits of adjustment of the shaft 227 suitable stop members 235 and 237, whereupon clutch 225 slips permitting shaft 220 to rotate without damage to the parts and without effecting an over-adjustment of the shaft 227. The stop members 235 and 237 limit the range of computation to within a predetermined operating range.

The shaft 227 is drivingly connected through gearing 239 to a shaft 241 which adjustably positions rotor winding 243 of a variable coupling transformer 245 and which rotor winding 243 is inductively coupled to stator windings 247. The stator windings 247, as hereinafter explained, are connected by conductors 248, 249 and 250 into a main control circuit so that adjustment of the rotor winding 243 serves to vary the setting of a fuel-air ratio control network shown in Figure 4. The rotor winding 243 is connected by conductor 252 and 253 across the source of constant-frequency alternating current.

*Altitude compensation*

In a system such as heretofore described, wherein changes in the ram-air inlet pressure affect a corresponding change in the excitation of the rotor winding 128, it will be seen that a change in the output of the rotary transformer 85 may be effected upon a change in the prevailing ambient atmospheric pressure causing a change in the excitation of winding 128. Moreover, because of such change in excitation due to change in atmospheric pressure, there may be obtained in turn a change in the output of the transformer 85 for degree of change in the coupling relation over that which would be effected for a constant excitation of the winding 128.

To compensate for such change in the output of transformer 85 or loop gain due to change in the ambient atmospheric pressure, there is provided the altitude compensator 143 including an atmospheric pressure responsive device and operating mechanism, as described in the aforenoted copending application Serial No. 270,846, for adjustably positioning through shaft 145 the rotor winding 140 in inductive relation to windings 144 so as to act in an inverse sense to that of the loop gain and cancel out this gain change.

The altitude compensator 143 includes a chamber having its interior connected through a conduit 259 to the static or ambient atmospheric pressure prevailing at the level of flight of the missile or aircraft.

Mounted within the chamber is a suitable mechanism, not shown, responsive to the static pressure applied through the conduit 259 which acts on the shaft 145 as explained in the aforenoted application Serial No. 270,846 to position through the shaft 145 the rotor 140 of the variable coupling transformer 142.

The gain of the altitude compensator 143 varies approximately as $$\frac{1}{P_0}$$

and the rotor winding 140 adjustably positioned through shaft 145 by the atmospheric pressure responsive mechanism of the altitude compensator 143 provides a means for modifying the servo loop gain, since the coupling between the rotor winding 140 and the stator windings 144 is so arranged that there will be induced into the stator winding 144 a signal modified to compensate for the loop gain; i. e., the coupling relation is such as to compensate in inverse relation for increases in the signal voltage applied across the rotor winding 128 of the variable coupling transformer 85 due to change in the prevailing atmospheric pressure.

The altitude compensator 143 thus maintains the loop gain at a constant value within plus or minus 20% of the mean value, whereas with no compensation the loop gain would vary by the ratio of the maximum to the minimum values of static pressure.

*Operation of fuel-air ratio computer*

The subject fuel-air ratio computer of Figure 2 is a device for computing fuel-air ratio from sensed ram-air inlet pressure and the fuel flow determined from the sensed fuel supply pressure and combustion chamber pressure acting across the fuel nozzles. The computer performs the computation of the fuel-air ratio, the result being a shaft 212 and 241 position which varies with the fuel-air ratio.

The variable-coupling transformer 245 having a rotor winding 243 positioned by the output shaft 241 converts the position of the rotor winding 243 to a set of signal voltages induced in stator windings 247 and which are functions of the prevailing fuel-air ratio. This set of signal voltages controls through lines 248, 249 and 250 the setting of a fuel-air ratio control for a ram-jet engine so as to maintain the fuel-air ratio selected by a Mach-number control indicated in Figure 4 by the numeral 53.

Figure 4:
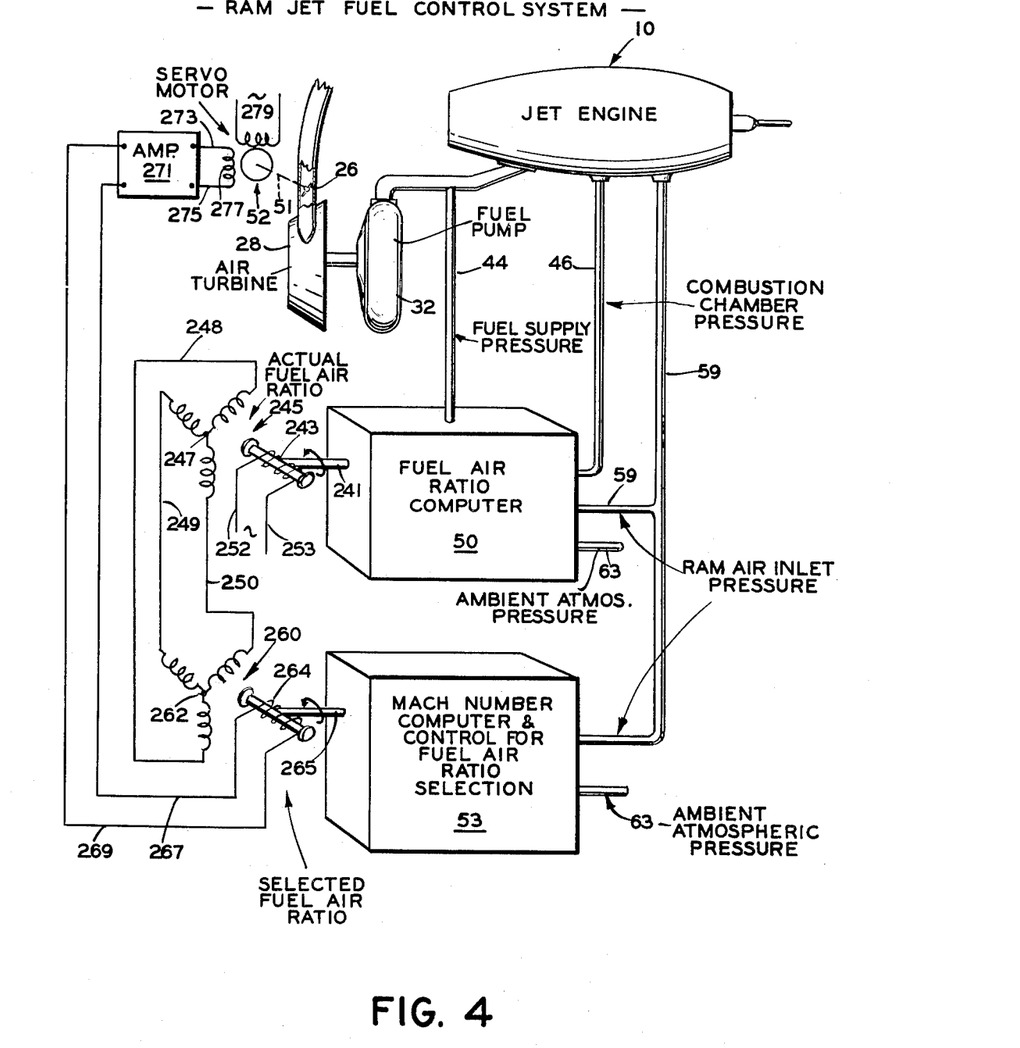
Figure 4 is a schematic diagram of the ram-jet fuel control system in which the fuel-air ratio computer of Figure 2 and the Mach-number control of Figure 3 are designed for use.

The fuel-air ratio control system of Figure 4 includes a variable coupling transformer 260 having stator windings 262 connected to the stator windings 247 through conductors 248, 249 and 250. There is further provided a rotor winding 264 inductively coupled to stator windings 262 and adjustably positioned by a shaft 265 controlled by the Mach-number control 53, as hereinafter explained, so as to select the fuel-air ratio to be maintained.

In such a system the rotor winding 243 is connected across the main source of alternating current and inductively coupled to the stator windings 247 of the variable coupling transformer 245. The variable coupling transformer 245 is of a conventional type having the stator windings 247 so arranged that when the computed actual fuel-air ratio equals the selected value the rotor winding 243 is adjusted relative to the windings 247 so that there is induced therein a signal voltage which acting through stator windings 262 induces in the rotor winding 264 a zero signal upon the rotor winding 264 having been first adjusted to a corresponding position by the shaft 265.

Thus, the arrangement is such as to effect a zero signal when the actual fuel-air ratio as computed by the computer 50 corresponds to the fuel-air ratio selected by the Mach-number control 53. However, adjustment of the rotor winding 243 to one side of the balance point effects a signal voltage in rotor winding 264 of one phase and adjustment to the other side of the balance point a signal voltage of the opposite phase when the computed actual fuel-air ratio is below or above the selected fuel-air ratio as the case may be. Conductors 267 and 269 connect the rotor winding 264 to the input of amplifier 271 of conventional type and having an output connected by conductors 273 and 275 to a control winding 277 of a conventional two-phase servomotor, indicated generally by the numeral 52. A fixed phase winding 279 is connected across the source of constant-frequency alternating current.

The phase of the signal voltage induced in the rotor winding 264 and applied to the input of the amplifier 271 controls the direction of rotation of the servomotor 52 so as to adjust through shaft 51 the throttling valve 26 to regulate the speed of the turbine 28 and thereby the speed of the fuel pump 32 so as to maintain the fuel-air ratio at the value selected by the Mach-number control 53.

Figure 3:
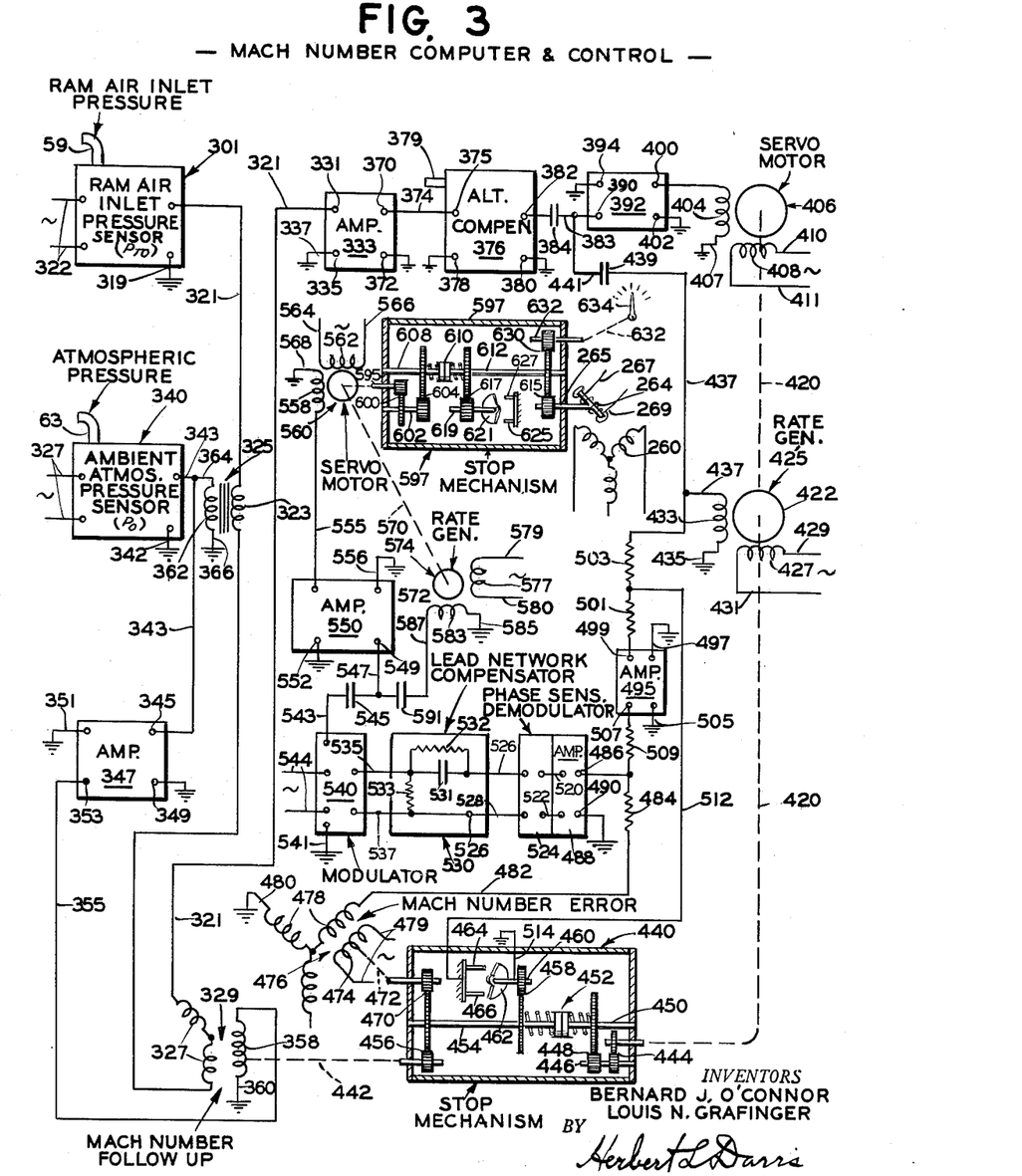
Figure 3 is a schematic diagram of the Mach-number control.

*Mach-number control of Figure 3*

The Mach-number control of Figure 3 provides a computer circuit of the type disclosed in our copending application Serial No. 270,846 in that the Mach number is derived from the approximate equation $$M = 0.93 + 0.189 P_{t_0}/P_0$$

in which one of the inputs to the Mach-number computer circuit is a voltage proportional to the total or ram-air inlet pressure, and a second input is a voltage proportional to the static or ambient atmospheric pressure. The computer circuit is so arranged that a servomotor controlled thereby drives an output shaft so that its position is proportional to the ratio $P_{t_0}/P_0$ and positions a variable coupling transformer or linear resolver on this shaft so that its output signal voltage is proportional to the deviation from the desired Mach-number of the computed Mach-number for in turn selecting a fuel-air ratio of such a value as to maintain the actual Mach-number at the desired value.

The Mach-number control, as shown in Figure 3, includes a Mach-number computer generally of a type heretofore disclosed and claimed in our said copending application Serial No. 270,846.

There is provided in the computer of Figure 3, a ram-air inlet pressure sensor 301 having its interior connected through the conduit 59 to the ram-air inlet pressure. Mounted within the pressure sensor 301 is a suitable mechanism, as explained in our aforenoted application, responsive to the ram-air inlet pressure and applying an electrical signal proportional thereto across output lines 319 and 321 of a frequency corresponding to that applied across input lines 322 from a suitable source of constant-frequency alternating current not shown. As explained in our aforenoted application, the magnitude of the electrical signal across lines 319 and 321 increases with ram-air inlet pressure. The output conductor 319 is connected to a common ground while the conductor 321 has serially connected therein a secondary winding 323 of a biasing transformer 325, as explained in our aforenoted application, and a secondary stator winding 327 of a variable coupling transformer 329. As shown in Figure 3, the conductor 321 leads to an input terminal 331 of an amplifier 333 having its other input terminal 335 connected by a conductor 337 to a common ground connection and thus to the electrical output of the ram-air inlet pressure sensor 301.

Also affecting the signal to the input of the amplifier 333 is a static or ambient atmospheric pressure sensor 340 having its interior connected through the conduit 63 to the static pressure or ambient atmospheric pressure. Mounted within the atmospheric pressure sensor 340 is suitable mechanism, as explained in our aforenoted application, responsive to the ambient atmospheric pressure and applying an electrical signal proportional thereto across output lines 342 and 343 of a frequency corresponding to that applied across input lines 327 from the source of constant-frequency alternating current. As explained in our aforenoted application, the magnitude of the electrical signal across lines 342 and 343 increases with ambient atmospheric pressure.

As shown in Figure 3, the output conductor 342 is connected to a common ground while the conductor 343 leads to an input 345 of an amplifier 347, having its other input 349 connected by a conductor to a common ground connection and, thus, to the electrical output of the static pressure sensor 340.

The amplifier 347 is of a conventional type and has an output connection 351 connected by a conductor to a common ground and another output connection 353 connected by a conductor 355 to a rotor-winding 358 of the variable coupling transformer 329. The opposite end of the rotor-winding 358 is connected by conductor 360 to a common ground so that the rotor-winding 358 of the variable coupling transformer 329 is connected across the output of the amplifier 347.

The variable coupling transformer 329 is of a conventional type having a pair of stator windings 327 reversely wound and arranged so that rotor-winding 358 may be adjusted in inductive relation thereto over a predetermined range.

The output voltage from the variable coupling transformer 329 will depend upon both the excitation of the rotor-winding 358 as well as the angular position of the rotor-winding 358 relative to the stator windings 327.

Biasing transformer 325

Further biasing the voltage output of the stator windings 327 in an inverse phase relation to that of the output from the total pressure sensor 321, is the biasing transformer 325 having its secondary winding 323 serially connected in the conductor 321 and arranged so as to shift the range of the variable coupling transformer 329 so that the zero or null point thereof corresponds approximately to the mid-point of the operating range of Mach-number.

The primary winding 362 of the biasing transformer 325 is connected by a conductor 364 to the conductor 343 and by a conductor 366 to a common ground. Thus, it will be seen that the primary winding 362 is connected across the output of the static pressure sensor 340 so that the biasing voltage introduced by the transformer 325 will increase with the voltage across the winding 358 as upon an increase in the prevailing static or ambient atmospheric pressure.

Bearing in mind that the loop circuit 321 seeks to compute the ratio between the ram-air inlet pressure and the static pressure as measured by the output voltages of the sensors 301 and 340, it will be seen that it will be necessary that the biasing voltage induced by the transformer 325 be compensated for changes in the prevailing static or atmospheric pressure.

Otherwise, changes in the excitation voltage of the winding 358 measuring the sensed static pressure ($P_0$), if summed with a constant biasing voltage, would not when compared with the output voltage from the ram-air inlet pressure sensor 301 ($Pt_0$) reflect the true ratio $Pt_0/P_0$, since changes in the static pressure would not affect the total voltage compared with the voltage from the pressure sensor 301 ($Pt_0$), but only a part thereof. However, by properly increasing the biasing voltage in direct relation with the increase in the output voltage from the static pressure sensor 340, as provided herein, the sum voltage representing a measure of the static pressure would be proportionately increased, rather than merely a part of the sum voltage so as to reflect the correct ratio between the static pressure voltage from the device 340 and the total pressure sensed voltage from the device 301.

Control circuit

When the rotor 358 has been adjusted to a position corresponding to the prevailing Mach-number, the voltages induced in the circuit 321 by the variable coupling transformer 329 and the biasing transformer 325 will balance that induced in line 321 by the total or the ram-inlet pressure sensor 301 so that no error signal would then be applied across the inlet terminals 331 and 335 of the amplifier 333.

However, upon the rotor 358 of the variable coupling transformer 329 being in a position such that under the prevailing pressure conditions there is a resultant error signal in one sense or the other, there will be then applied to the input 331—335 of the amplifier 333 an error signal which is then amplified through the amplifier 333 and applied to output terminals 370 and 372 of the amplifier 333. The amplifier 333 may be of suitable conventional type and has its output terminal 372 connected by a conductor to a common ground, while its output terminal 370 is connected by a conductor 374 to input terminal 375 of an altitude compensator 376. Another input terminal 378 of the altitude compensator 376 is connected by a conductor to a common ground. Thus, the input to the altitude compensator 376 is connected across the output terminals 370 and 372 of the amplifier 333.

The altitude compensator 376 includes a chamber having its interior connected through a conduit 379 to the static or ambient atmospheric pressure prevailing at the level of flight of the aircraft or missile. Mounted within the chamber is suitable mechanism not shown which may be of the general type heretofore described with reference to the altitude compensation 143 of Figure 2 and described in greater detail in our copending application Serial No. 270,846.

The altitude compensator 376 has output terminals 380 and 382, one of which is connected by a conductor to a common ground while the other terminal 382 is connected by a conductor 383 and capacitor 384 to an input terminal 390 of an amplifier 392. The opposite input terminal 394 of amplifier 392 is connected by a conductor to a common ground.

Amplifier 392 is of conventional type and has output terminals 400 and 402. The terminal 400 leads to a control winding 404 of a two-phase reversible electric servomotor 406 of conventional type. The opposite end of the control winding 404 is connected by a conductor 407 to a common ground and thereby to the output terminal 402 also connected by a conductor to the common ground. The servomotor 406 has a fixed phase winding 408 connected across the source of constant-frequency alternating current through conductors 410 and 411.

Thus, the control winding 404 of the servomotor 406 is connected across the output terminal 400—402 of the amplifier 392. The direction of rotation of the servomotor 406 will be determined in a conventional manner by the electrical phase of the control signal applied across the output terminals 400—402 of the amplifier 392, which is in turn dependent upon the phase of the signal applied across the input terminals 331—335 of the amplifier 333, which is dependent upon the signal voltage affecting circuit 321. Moreover, the speed of rotation of the motor 406 will vary directly with the magnitude of the control signal at the output terminals 400—402 of the amplifier 392.

Rate generator

The servomotor 406 drives through a shaft 420 a rotor element 422 of a rate generator 425. The rate generator 425 is of conventional type and has an input winding 427 connected by conductors 429 and 431 across the source of constant-frequency alternating current. There is further provided an output winding 433 connected by conductor 435 to a common ground and by another conductor 437 through a capacitor 439 and conductors 441 and 383 to the input terminal 390 of the amplifier 392. Thus, the output winding 433 of the rate generator 425 is connected across the input terminals 390—394 of the amplifier 392.

Adjustment of the servomotor 406 in one direction or the other, effects rotation of the rate generator 425 so as to induce an A. C. rate signal in the output winding 433 applying in turn an A. C. rate signal across the input terminals 390 and 394 of a phase acting in inverse relation to the error signal applied across input terminals 390 and 394 from output terminals 380 and 382 so as to tend to retard and prevent over-adjustment of the servomotor 406. The rate signal induced by the rate generator 425 is of a magnitude proportional to the speed of the motor 406 which in turn tends to reflect the rate-of-change of the Mach-number.

*Stop mechanism*

Moreover, upon an error signal, the shaft 420 of the servomotor 425 drives through a stop mechanism 440 a shaft 442 to position the rotor winding 358 of the variable coupling transformer 329 in a direction so as to wipe out the error signal and rebalance the voltages in circuit 321.

The stop mechanism 440 includes gearing 444 driven by the shaft 420, a stub shaft 446, gearing 448, a second shaft 450 drivingly connected by a spring clutch 452 of conventional type to a third shaft 454. Shaft 454 in turn is connected through gearing 456 to the shaft 442. Also driven from shaft 454 is a second gearing 458, and shaft 460 connected to a member 462 which is arranged to engage at predetermined minimum and maximum limits of adjustment of the shaft 460 suitable members 464 and 466 which serve as electrical contact members to close an electrical circuit, as hereinafter explained, and as mechanical stop members for limiting rotary movement of the shafts 460 and 454, whereupon clutch 452 slips permitting shaft 450 to rotate without damage to the parts.

The stop members 464 and 466 limit the range of computation to the range wherein the computations according to the aforenoted equation $M = 0.93 + 0.189 P_{t_0}/P_0$ has sufficient accuracy to be useful.

The shaft 454 within its normal range of adjustment drives the rotor winding 358 of the follow-up variable coupling transformer 329 and also drives through a gearing 470 and shaft 472 a rotor winding 474 of a variable coupling transformer 476 having reversely wound stator windings 478. The rotor winding 474 is connected by conductors 479 across the source of constant-frequency alternating current and is inductively coupled to the stator winding so as to apply across output lines 480 and 482 a signal voltage of a phase and magnitude dependent upon the deviation of the actual Mach-number from the predetermined desired Mach-number and a signal voltage serving to vary the setting of a fuel-air ratio selector so as to tend to maintain the Mach-number at the desired value. When the Mach-number is at the desired value the voltages induced in the reversely wound windings 478 will balance resulting in a null signal voltage across the output lines 480 and 482.

*Fuel-air ratio controller*

As shown in Figure 3, the output conductor 480 is connected to a common ground while the output conductor 482 leads through a resistor 484 to an input terminal 486 of an amplifier 488, while the opposite input terminal 490 of the amplifier 488 is connected to the common ground. Thus, the output lines 480 and 482 are connected to the input of the amplifier 488 which may be of a conventional type.

The output of the rate generator 425 also leads to the input of the amplifier 488 through an amplifier 495 also of conventional type. More particularly the grounded output connection 435 of the rate generator 425 is connected through a common ground to an input terminal 497 of the amplifier 495 while another input terminal 499 of the amplifier 495 is connected through resistors 501 and 503 to the output conductor 437 leading from the output of the rate generator 425. The amplifier 495 has output terminals 505 and 507. The output terminal 505 of the amplifier 495 is connected through a common ground to the input terminal 490 of the amplifier 488 while the other output terminal 507 of the amplifier 495 is connected through resistor 509 to the input terminal 486 of the amplifier 488.

It will be seen then that the sum of the two signals; i. e., the Mach-number error signal induced in the output of the stator windings 478 and the rate-of-change of Mach-number signal induced in the output of the rate generator 425 and amplified through the amplifier 495 are then applied to the input of amplifier 488.

Controlling the application of the output signal from the rate generator 425 to the amplifier 495 is a switch mechanism including a conductor 512 leading from a point intermediate the resistors 501 and 503 to the contact members 464 and 466 in the stop mechanism 440 and cooperating with the movable member 462 formed of a suitable electrical conductive material and connected through a conductor 514 to a common ground. Thus, under conditions in which the prevailing Mach-number of the aircraft 10 is in excess of a predetermined minimum or maximum value the member 462 engages contact 464 or 466 so as to connect the output conductor 437 of the rate generator 425 to ground through conductors 512 and 514 and thereby shorting the output of the rate generator 425. When the Mach-number is within a predetermined range in which operation of the rate generator is desired, the movable member 462 is adjusted out of engagement with either of the contact members 464 and 466 opening the shunt circuit so that the output signal from the generator 425 may be applied through amplifier 495 and then summed through resistor 509 with the Mach-number error signal applied through resistor 484 and the resulting signal applied to the input of the amplifier 488.

The ouput conductors 520 and 522 lead from the amplifier 488 to the input of a phase sensitive demodulator 524 of conventional type arranged to apply a direct current across output lines 526 and 528 of a polarity depending upon the phase of the control signal applied across input lines 520 and 522 and of an amplitude proportional to the amplitude of the controlling signal.

The ouput from the demodulator 524 is applied through lines 526—528 to a lead network 530 of conventional type and including a capacitor 531 and resistor 532 and 533 combination so arranged as to give a direct current output signal across lines 535 and 537 proportional to the Mach-number error signal plus the first and second time derivatives of the signal, i. e., the rate-of-change of the Mach-number error and the rate-of-change of the rate-of-change.

The output signal applied across lines 535 and 537 is in turn applied to a modulator 540 of conventional type and arranged to convert the direct current output signal across lines 535 and 537 to an alternating current control signal applied across ouput lines 541 and 543. The frequency of the A. C. control signal will correspond to the frequency of the current from the A. C. source connected across the lines 544 and the phase and magnitude of the control signal will be determined by the polarity and magnitude of the current applied across lines 535—537. The conductor 543 is connected through a capacitor 545 and conductor 547 to an input terminal 549 of an amplifier 550. The other input terminal 552 of the amplifier 550 is connected by a common ground to grounded conductor 541.

Amplifier 550 is of conventional type and has output conductors 555 and 556. Conductor 555 is connected to one end of a control winding 558 of a two-phase reversible electric servomotor 560 of conventional type and having a fixed phase winding 562 connected across the source of constant-frequency alternating current through conductors 564 and 566. The other end of the control winding 558 is connected by a conductor 568 to a common ground and thereby to the grounded output of the amplifier 550.

Thus, the control winding 558 of the servomotor 560 is connected across the output 555—556 of the amplifier 550. The direction of rotation of the servomotor 560 will be determined in a conventional manner by the electrical phase of the control signal applied across the ouput conductors 555—556 of the amplifier 550, which is in turn dependent upon the phase of the signal applied across the input terminals 486—490 of the amplifier 488 which is, of course, dependent upon the sum of the Mach-number error signal and the rate-of-change of Mach-number signals as hereinafter explained. Moreover, the speed of rotation of the motor 560 will vary directly with the magnitude of the control signal of the output terminals 555 and 556 of the amplifier 550.

*Rate generator*

The servomotor 560 drives through a shaft 570 a rotor element 572 of a rate generator 574. The rate generator 574 is of a conventional type and has an input winding 577 connected by conductors 579 and 580 across the source of constant-frequency alternating current. There is further provided an output winding 583 connected by conductor 585 to a common ground and by another conductor 587, capacitor 591 and conductor 547 to the input of the amplifier 550. Thus, the output winding 583 is connected across the input terminals 549 and 552 of the amplifier 550.

Adjustment of the servomotor 560 in one direction or the other, effects rotation of the rate generator 574 in such a direction as to apply a rate signal across the input terminals 549 and 552 acting in inverse relation to the controlling signal applied by the modulator 540 across input terminals 549 and 552 so as to tend to retard and prevent overadjustment of the servomotor 560. The rate signal induced by the rate generator 574 is proportional to the speed of the servomotor 560.

Further the servomotor 560 drives a shaft 595 and through a stop mechanism 597, the shaft 265, to position the rotor winding 264 of the variable coupling transformer 260 in a direction for selecting a fuel-air ratio of a value to effect a predetermined Mach-number under the prevailing operating conditions of the controlled aircraft 10, as heretofore explained with reference to Figure 4.

The stop mechanism 597 includes gearing 600 driven by the shaft 595, a stub shaft 602, gearing 604, a second shaft 608, drivingly connected by a spring clutch 610 of conventional type to a third shaft 612. Shaft 612 in turn is connected through gearing 615 to the shaft 265. Also driven from shaft 612 is a second gearing 617 and shaft 619 connected to a member 621 which is arranged to engage at minimum and maximum limits of adjustment of the shaft 612 suitable stop members 625 and 627, whereupon clutch 610 slips permitting shaft 608 to rotate without damage to the parts, while adjustment of the rotor winding 264 is limited to a predetermined range.

The stop members 625 and 627 limit the range of selected fuel-air ratio to within a predetermined safe operating range so as to prevent blow-out of combustion chamber 16 due to either an excessively rich or lean fuel-air ratio in the event severe loading should occur due to maneuvering of the aircraft 10.

The shaft 612 is further drivingly connected through gearing 630 to a shaft 632 which adjustably positions a pointer 634 cooperating with a suitable scale for visually indicating the selected fuel-air ratio.

The combustion chamber 16 of the aircraft engine 10, as is characteristic of such engines, has a maximum and minimum fuel-air ratio range beyond which the combustion flame will blow out and the fire stops burning in the combustion chamber 16.

The fuel-air ratio control system is so designed that while primarily controlling to a predetermined Mach number, the blow-out characteristics aforenoted controls over the Mach-number control so that if the Mach-number control system should call for either an excessively rich or lean fuel-air ratio, the system will not respond beyond the safe maximum or minimum limits of the control provided by the stop members 625 and 627.

*Operation of the Mach-number computer for fuel-air ratio selection*

The subject Mach-number computer is a device for computing Mach-number from ram-air inlet pressure and the ambient atmospheric pressure. For a range of Mach-numbers, $M=1.5$ to $M=2.5$ the Mach-number may be approximated with sufficient accuracy by the following equations:

$$M = 0.189 P_{t_0}/P_0 + 0.93$$

$P_{t_0}$ = total or ram pressure sensed at the mouth of the Pitot tube (shock wave at Pitot mouth)

$P_0$ = static or ambient atmospheric pressure sensed after the shock wave by Pitot tube.

The pressures $P_{t_0}$ (total pressure) and $P_0$ (static pressure) are the inputs to the Mach-number computer. The computer performs the computation of the foregoing equation, the result being a position of shafts 442 and 472 which varies with Mach-number.

A variable coupling transformer 476 having a rotor winding 474 coupled to the output shaft 472 converts the position of the rotor winding 474 to a signal voltage proportional to the deviation from a desired Mach-number for controlling through output lines 480 and 482 the setting of a fuel-air ratio control system of the jet engine so as to maintain the Mach-number at the desired value.

In such a system the rotor winding 474 is connected across the main source of constant-frequency alternating current and inductively coupled to the stator windings 478 of the variable coupling transformer 476. The variable coupling transformer 476 is of a conventional type having a pair of stator windings 478 reversely wound and arranged so that rotor winding 474 when adjusted to a predetermined balance point bisects the angle made by the juncture of the two active stator windings 478 so as to effect a zero signal when the Mach-number is at the desired value of, for example, 2.0; while adjustment of the rotor winding 474 to one side of the balance point effects a signal voltage across output lines 480 and 482 of one phase and adjustment to the other side of the balance point a signal voltage of the opposite phase when the Mach-number is below or above the desired Mach-number, as the case may be, so as to cause an input signal to effect the fuel-air ratio of the engine to bring the Mach-number to the desired regulated value.

Since the computer is relatively fast compared with changes in the missile Mach-number, the speed of the computer servomotor 406 will be proportional to the rate-of-change of Mach-number (also rate-of-change of Mach-number error).

The control signal to the amplifier 488 is the resultant sum of the Mach-number error signal applied across lines 480 and 482 and the rate signal applied across lines 505 and 507. This rate signal may oppose or aid the Mach-number error signal depending upon whether the Mach-number is increasing or decreasing and whether the Mach-number is above or below a predetermined desired value.

The arrangement is such that if the Mach-number is above the predetermined value and increasing, the rate signal will add to the Mach-number error signal and act in the sense to cause the controlled servomotor 560 to drive the rotor winding 264 in a direction tending to vary the selected fuel-air ratio in a fuel decreasing sense. However, should the Mach-number be above the predetermined value and decreasing, the rate signal will act in a fuel increasing sense and oppose the Mach-number error signal and the greater of the two signals will control. Similarly, if the Mach-number is below the predetermined value and decreasing, the rate signal will add to that of the Mach-number error signal to give a resultant signal controlling the servomotor 560 so as to tend to drive the rotor 264 in a sense to vary the selected fuel-air ratio in a fuel increasing sense. However, if the Mach-number is below the predetermined value and increasing, the rate signal will act in a fuel decreasing sense and oppose the Mach-number error signal and the greater of the two signals will control.

In controlling an aircraft or missile, as in the instant case, the problem is not only to maintain the aircraft or missile at a predetermined Mach-number but also to provide means to get the aircraft or missile in flight up to a predetermined Mach-number of, for example, 2.0 as rapidly as feasible and then without excessively overshooting the predetermined desired Mach-number to maintain it at this Mach-number.

In the present invention this is effected by providing the novel switch element 462 cooperating with the stops 464 and 466 of the stop mechanism so that the rate signal is cut out of operation during the initial operation of the control so that as the Mach-number of the missile or aircraft remains below a second predetermined Mach-number of, for example, 1.7 in approaching the desired Mach-number of, for example 2.0 the switch member 462 will remain in contacting relation with the minimum stop 466 until the Mach-number of the aircraft or missile reaches the value of said second Mach-number 1.7, at which time the member 462 opens the contact 466 whereupon the rate signal from the rate generator 425 is summed with the Mach-number error signal and applied to the input of the amplifier 488. At this point the Mach-number error signal while below the desired predetermined value of, for example 2.0, the Mach-number will be increasing very rapidly so that the rate signal applied by the generator 425 and opposing the Mach-number error signal will control so as to apply a control signal to the servomotor 560, which will cause the rotor element 264 to be driven in a direction for decreasing the selected fuel-air ratio so that the aircraft or missile will be brought to the predetermined Mach-number 2 without excessive overshooting.

After the predetermined desired Mach-number has been reached, the Mach-number computer selects a fuel-air ratio through the positioning of the rotor winding 264 by the servomotor 560 in accordance with any deviation of the computed Mach-number from the predetermined Mach-number, while the fuel-air ratio computer of Figure 2 controls the fuel to the engine in accordance with any deviation of the computed actual fuel-air ratio from the selected fuel-air ratio so as to regulate the fuel-air ratio and effect the predetermined Mach-number under the prevailing flight conditions.

As heretofore explained with reference to Figure 3, there is further provided in the Mach-number control of Figure 3 the lead-network compensator indicated in Figure 3 by the numeral 530 and operating upon the Mach-number error plus error-rate signal to give an effective control signal proportional to Mach-number error, plus the first and second time derivatives of Mach-number, i. e. rate-of-change of Mach-number error and the rate-of-change of the rate-of-change of Mach-number error. This composite control signal causes the servomotor 560 to position the rotor winding 264 so as to select whatever fuel-air ratio is necessary to maintain the aircraft or missile at the predetermined desired Mach-number under the prevailing operating conditions and thus to eliminate any Mach-number error under steady flight conditions. The derivative functions in the control permit greater gain in the Mach-number loop so that the system responds faster and reduces overshooting in transients.

As heretofore explained, the fuel-control system provides a first control loop, as shown in Figure 2 and diagrammatically in Figure 4, to compute the actual fuel-air ratio of the engine under the prevailing operating conditions and a second control loop, shown in Figure 3, and diagrammatically in Figure 4, to compute the actual Mach-number of the aircraft under the prevailing flight conditions. The second control loop operates a fuel-air ratio selecting means, as shown in Figure 4, to vary the selected fuel-air ratio so as correct any difference between the computed actual Mach-number and a predetermined desired Mach-number such as, for example, Mach-number 2.0. Upon the fuel-air ratio selected by the second control loop being unbalanced by the actual fuel-air ratio computed by the first control loop there is effected an error signal for causing a fuel-control means or variable-speed pump, as shown in Figure 4, to vary the fuel-air ratio to the value selected by the second control loop so as to maintain the actual computed Mach-number at the preselected value.

Moreover, due to the novel arrangement of the stop mechanism 597 the control system is prevented from selecting fuel-air ratios exceeding predetermined minimum and maximum limits so as to prevent blowout of the engine due to either an excessive rich or lean fuel-air ratio which might otherwise occur under extreme operating conditions of the aircraft or missile.

Further, through the novel arrangement of this stop mechanism 597, under abnormal flight conditions in which the prevailing Mach-number error and error rate is such as to cause the stop mechanism to be driven into engagement with either its upper or lower limit stops, the Mach-number control loop will be cut out of operation and will remain cut out of operation until the increase (or decrease) in thrust of the aircraft operating at the maximum (or minimum) fuel-air ratio has brought the aircraft or missile Mach-number error and error rate back within the range for operation of the fuel-air ratio control so as to insure that the fuel-air ratio is maintained within the combustion operating range at all times.

Thus, for any operating conditions in which the Mach-number requirements and the fuel-air ratio requirements cannot be met simultaneously, the fuel-air ratio will be set to insure against engine blowout.

Although only one embodiment of the invention has been described, various changes in the form and relative arrangement of the parts may be made to suit requirements.

What is claimed is:

1. A control system for an aircraft engine having means for supplying air and fuel under pressure to the engine, comprising a fuel-air ratio computer sensitive to the fuel and air supply pressures, a Mach-number computer, fuel supply control means, means operatively connecting the fuel-air ratio computer to said control means to maintain the fuel-air ratio at a selected value, datum changing means for varying the selected fuel-air ratio value, and means operatively connecting the Mach-number computer to said datum changing means so as to vary the selected fuel-air ratio in a sense to maintain the aircraft in flight at a pretermined Mach-number.

2. In a control system for a jet aircraft engine having a combustion chamber, a ram-air inlet to said chamber, and means for supplying fuel under pressure to said chamber, the combination comprising a fuel-air ratio computer including fuel supply pressure responsive means, combustion chamber pressure responsive means, and ram-air inlet pressure responsive means; a Mach-number computer including a ram-air inlet pressure responsive means and an ambient atmospheric pressure responsive means; a fuel control means including a motor and means operated thereby for varying the supply of fuel to said chamber, and means operatively connecting said fuel-air ratio computer and Mach-number computer to said motor so as to jointly control the fuel supply varying means so as to maintain the aircraft in flight at a predetermined Mach-number.

3. In a control system for an aircraft engine having a combustion chamber, a ram-air inlet to said chamber, and means for supplying fuel under pressure to said chamber; the combination comprising fuel-air ratio responsive means, airspeed responsive means, fuel supply control means, means for operatively connecting said airspeed responsive means and said fuel-air ratio responsive means to said fuel control means to cause an initial acceleration of the aircraft in flight to a predetermined airspeed and thereafter regulate the fuel control means so as to maintain the aircraft at said predetermined airspeed, rate-of-change responsive means operated by said airspeed responsive means, means to operatively connect the rate-of-change responsive means to said fuel supply control means so as to effect an adjustment of the fuel control means in a fuel decreasing sense as the predetermined regulated airspeed is approached during the initial acceleration of said aircraft.

4. The combination defined by claim 3 in which the means to operatively connect the rate-of-change responsive means to said fuel supply control means includes a control element operated by the airspeed responsive means so as to control said connecting means, said control element being operated by said airspeed responsive means at airspeeds in excess of a predetermined minimum value to effect an operative connection between said rate-of-change responsive means and said fuel control means, said rate-of-change responsive means being arranged to effect through said operative connection an adjustment of the fuel control means in a fuel decreasing sense during the initial acceleration of said aircraft as the predetermined regulated airspeed is approached.

5. The combination defined by claim 4 in which said rate-of-change responsive means includes an electrical generator driven by said airspeed responsive means and having an output voltage proportional to the rate-of-change of the airspeed of said aircraft, and an electrical network means operatively connecting the output of the generator to the fuel supply control means so as to effect an adjustment of the fuel control means in a fuel decreasing sense as the predetermined regulated airspeed is approached during the initial acceleration of the aircraft.

6. The combination defined by claim 5 in which said electrical network includes an electrical switching means operated by the airspeed responsive means so as to control the connection of the output of the generator to the fuel supply control means through said electrical network, said switching means being operated by said airspeed responsive means at airspeeds in excess of a predetermined minimum value to effect through said electrical network an operative connection between the output of the generator and the fuel control means so as to effect an adjustment of the fuel control means in a fuel decreasing sense as the predetermined regulated airspeed is approached during the initial aceleration of the aircraft.

7. For use with an aircraft engine having means for supplying air and fuel under pressure to the engine; the combination comprising a first variable voltage device, a second variable voltage device, ram-air inlet pressure responsive means for operating the first device, ambient atmospheric pressure responsive means for operating the second device, a variable coupling transformer having a secondary winding and a primary winding inductively coupled thereto, means electrically connecting one of the devices to said primary winding to excite the primary winding, circuit means electrically connecting the other device in series with the output of said secondary winding, motor means controlled by said circuit means to adjust the coupling relation between the primary and secondary windings of said variable coupling transformer to electrically balance said circuit means, a fuel-air ratio selector mechanism for controlling the supply of fuel to said engine, said selector mechanism being adjustably positioned by said motor means, a generator driven by said motor means at a rate proportional to the rate-of-change in airspeed of the aircraft, said generator having an output operatively connected to said fuel-air ratio selector mechanism and acting in a sense tending to decrease the supply of fuel to the engine with increase in the airspeed of the aircraft.

8. The combination defined by claim 7 including electrical switching means operated by the motor means to control the connection between the output of the generator and the fuel-air ratio selector mechanism, said switching means being operated by said motor means at airspeeds of the aircraft in excess of a predetermined minimum value to effect an operative connection between the output of the generator and the selector mechanism, and said switching means being operated by said motor means at airspeeds of the aircraft below said predetermined minimum value to place said generator in an inoperative relation to said selector mechanism.

9. For use with an air-fuel ratio control system of an aircraft engine; a Mach-number computer comprising a ram-air inlet pressure responsive device, an ambient atmospheric pressure responsive device, a variable speed reversible motor, an electrical computer network for controlling said motor, means connecting said pressure responsive devices in said network including variable coupling transformer means, means drivingly connecting said motor to said variable coupling transformer means for electrically balancing said network, an air-fuel ratio selector mechanism driven by said motor so as to regulate the airspeed of the engine to a predetermined Mach-number, a generator driven by said motor at a speed varying directly with the rate-of-change of the Mach-number, said generator having an output voltage proportional to the rate-of-change of the Mach-number, and means operatively connecting the output of the generator to the air-fuel ratio selector mechanism so as to tend to momentarily vary the air-fuel ratio selected by said mechanism in a sense tending to retard change of the Mach-number.

10. The combination comprising a first variable voltage device, a second variable voltage device, fuel flow sensing means for operating the first device, ram-air inlet pressure sensing means for operating the second device, a variable coupling transformer having a secondary winding and a primary winding inductively coupled thereto, means electrically connecting one of the devices to said primary winding to excite the primary winding, circuit means electrically connecting the other device in series with the output of said secondary winding, motor means controlled by said circuit means to adjust the coupling relation between the primary and secondary windings of said variable coupling transformer to electrically balance said circuit means.

11. The combination defined by claim 10 including a fuel-air ratio selector mechanism, a fuel-air ratio control mechanism adjustably positioned by the motor means so as to maintain the fuel-air ratio at a value set by the selector mechanism.

12. The combination defined by claim 10 including a stop mechanism for limiting the adjustment of the coupling relation of the variable coupling transformer to predetermined minimum and maximum values, and clutch means between said stop mechanism and motor means for permitting slippage of said motor means relative to said stop mechanism.

13. The combination defined by claim 10 including a variable induction transformer for operatively coupling the circuit means to said motor means, and ambient atmospheric pressure responsive means for operating said variable induction transformer so as to modify the effect of said circuit means on the motor means with changes in the ambient atmospheric pressure.

14. For use with an air-fuel ratio control system of an aircraft engine; the combination comprising a first variable voltage device, a second variable voltage device, fuel flow sensing means for operating the first device, ram-air inlet pressure sensing means for operating the second device, a first variable induction transformer having a secondary winding and a primary winding inductively coupled thereto, means electrically connecting one of the variable voltage devices to said primary winding to excite the primary winding, circuit means electrically connecting the other variable voltage device in series with the output of said secondary winding, motor means for adjusting the coupling relation between the windings of the first variable induction transformer so as to electrically balance said circuit means, a second variable induction transformer for operatively coupling the circuit means to said motor means, ambient atmospheric pressure responsive means for operating said second variable induction transformer so as to modify the effect of said circuit means on the motor means with changes in the ambient atmospheric pressure, and a fuel-air ratio control mechanism adjustably positioned by the motor means so as to maintain a selected fuel-air ratio.

15. A fuel-air ratio computer comprising a fuel flow sensing device, a ram-air inlet pressure sensing device, a reversible motor, an electrical computer network for controlling said motor, means connecting said devices in said network including variable coupling transformer means, and means drivingly connecting said motor to said variable coupling transformer means for electrically balancing said network.

16. The combination defined by claim 15 including another variable coupling transformer for operatively connecting said computer network to said motor, and ambient atmospheric pressure responsive means for operating said other variable coupling transformer to modify the effect of said network on the motor.

17. The combination defined by claim 15 including an air-fuel ratio controller driven by said motor to regulate the air-fuel ratio to a selected value.

18. A ram-jet aircraft engine fuel control system comprising a first electrical control network including means to sense the fuel-air ratio of the engine under prevailing operating conditions, a second electrical control network including means to sense airspeed of the engine under prevailing operating conditions, a third normally balanced electrical control network including means for controlling the fuel-air ratio of the engine, first motor means controlled by the first network for varying the electrical balance of the third network, second motor means controlled by the second network for varying the electrical balance of the third network, said first and second mentioned motor means coacting through said third control network to cause the fuel-air ratio control means to vary the fuel-air ratio of the engine so as to maintain the airspeed of the engine at a preselected value during normal flight of the aircraft.

19. The combination defined by claim 18 in which said second electrical control network includes a third reversible motor means, said third motor means being controlled by the airspeed sensitive means so as to operate in one direction upon an increase in airspeed and in an opposite direction upon a decrease in airspeed and at a speed proportional to the rate-of-change in the airspeed of the engine, rate-of-change responsive means driven by said third motor means, and means operatively connecting the rate-of-change responsive means to the second motor means so as to tend to cause the second motor means to vary the electrical balance of the third network in a sense to cause the fuel-air ratio control means to increase the supply of fuel to the engine upon the engine airspeed decreasing and to decrease the supply to fuel to the engine upon the engine airspeed increasing.

20. The combination defined by claim 19 including means operated by the third motor means for connecting the rate-of-change responsive means in operation during flight of the aircraft within a predetermined airspeed range and out of operation during flight of the aircraft at airspeeds exceeding said predetermined range.

21. The combination defined by claim 18 in which said second electrical control network includes a third reversible motor means, said third motor means being controlled by the airspeed sensitive means so as to operate in one direction upon an increase in airspeed and in an opposite direction upon a decrease in airspeed and at a speed proportional to the rate-of-change in the airspeed of the engine, an electrical generator driven by said third motor means, and means operatively connecting the generator to the second motor means so as to tend to cause the second motor means to affect the third network in a sense to increase the supply of fuel to the engine upon the engine airspeed decreasing and to decrease the supply of fuel to the engine upon the engine airspeed increasing.

22. The combination defined by claim 21 including means operated by the third motor means for connecting the generator in operation during flight of the aircraft within a predetermined airspeed range and out of operation during flight of the aircraft at airspeeds exceeding said predetermined range.

23. A ram-jet aircraft engine fuel control system comprising an engine fuel condition sensitive means, an engine airspeed sensitive means, means for regulating the supply of fuel to the engine, said first and second mentioned means controlling the regulating means so as to maintain the airspeed of the engine at a preselected value during normal flight of the aircraft, a reversible motor means, said motor means being controlled by the airspeed sensitive means so as to operate in one direction upon an increase in airspeed and in an opposite direction upon a decrease in airspeed and at a speed proportional to the rate-of-change of the airspeed of the engine, rate-of-change responsive means driven by said motor means, and means operatively connecting the rate-of-change responsive means to the regulating means so as to tend to increase the supply of fuel to the engine upon the airspeed decreasing and decrease the supply of fuel to the engine upon the air-speed increasing.

24. The combination defined by claim 23 including means controlled by the motor means for connecting the rate-of-change responsive means in and out of operation.

References Cited in the file of this patent

UNITED STATES PATENTS

| 2,540,594 | Price | Feb. 6, 1951 |
|---|---|---|
| 2,550,678 | Deacon | May 1, 1951 |